United States Patent
Ljolje et al.

(10) Patent No.: US 8,073,693 B2
(45) Date of Patent: Dec. 6, 2011

(54) SYSTEM AND METHOD FOR PRONUNCIATION MODELING

(75) Inventors: Andrej Ljolje, Morris Plains, NJ (US); Alistair D. Conkie, Morristown, NJ (US); Ann K. Syrdal, Morristown, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 512 days.

(21) Appl. No.: 12/328,407

(22) Filed: Dec. 4, 2008

(65) Prior Publication Data
US 2010/0145707 A1    Jun. 10, 2010

(51) Int. Cl.
*G10L 15/02* (2006.01)
(52) U.S. Cl. .......................................................... 704/254
(58) Field of Classification Search ................... 704/254
See application file for complete search history.

(56) References Cited

U.S. PATENT DOCUMENTS

| | | | |
|---|---|---|---|
| 5,033,087 A * | 7/1991 | Bahl et al. | 704/256.5 |
| 7,315,811 B2 * | 1/2008 | Cote et al. | 704/9 |
| 7,392,184 B2 * | 6/2008 | Viikki et al. | 704/236 |
| 7,567,903 B1 * | 7/2009 | Goffin et al. | 704/261 |

* cited by examiner

*Primary Examiner* — Susan McFadden

(57) ABSTRACT

Systems, computer-implemented methods, and tangible computer-readable media for generating a pronunciation model. The method includes identifying a generic model of speech composed of phonemes, identifying a family of interchangeable phonemic alternatives for a phoneme in the generic model of speech, labeling the family of interchangeable phonemic alternatives as referring to the same phoneme, and generating a pronunciation model which substitutes each family for each respective phoneme. In one aspect, the generic model of speech is a vocal tract length normalized acoustic model. Interchangeable phonemic alternatives can represent a same phoneme for different dialectal classes. An interchangeable phonemic alternative can include a string of phonemes.

5 Claims, 4 Drawing Sheets

SYSTEM AND METHOD FOR PRONUNCIATION MODELING

BACKGROUND OF THE INVENTION

1. Field of the Invention

The present invention relates to speech recognition and more specifically to pronunciation modeling.

2. Introduction

Pronunciation modeling is a way to model speech having different accents or dialects. One problem with current pronunciation modeling approaches is that dialectal variations are difficult to separate from other differences in speech, such as gender differences, age differences, and so forth. Two standard pronunciation modeling techniques are known in the art. A first manual approach to pronunciation modeling involves human linguists manually creating pronunciation dictionaries. A second automatic approach creates acoustic clusters that are very marginally tied to dialectal variation, if at all. Instead, this automatic approach partitions data into acoustic dimensions unrelated to dialect, such as males/females. Traditional pronunciation modeling techniques are rarely able to address dialectal variation, because other acoustic variations dominate and are easily recognized. When traditional pronunciation modeling techniques do address dialectal variations, the process is expensive and slow. These techniques produce dictionaries using an alternative phoneme symbol to allow for an alternative dialectal pronunciation. So, for example, dictionaries describing southern accents that diphthongize some lax vowels include "ey" in parallel to "ae". The problem with this solution is that the diphthongized "ae" is different both from the conventional "ae", conventional "ey" and the "ey" within the dialect that would diphthongize "ae". These related but separately stored phonemes cause confusion and disparity when modeling various speech dialects. Accordingly, what is needed in the art is an improved way to model pronunciations.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed are systems, computer-implemented methods, and tangible computer-readable media for generating a pronunciation model. The method includes identifying a generic model of speech composed of phonemes, identifying a family of interchangeable phonemic alternatives for a phoneme in the generic model of speech, labeling the family of interchangeable phonemic alternatives as referring to the same phoneme, and generating a pronunciation model which substitutes each family for each respective phoneme. In one aspect, the generic model of speech is a vocal tract length normalized acoustic model. Interchangeable phonemic alternatives can represent a same phoneme for different dialectal classes. An interchangeable phonemic alternative can include a string of phonemes.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
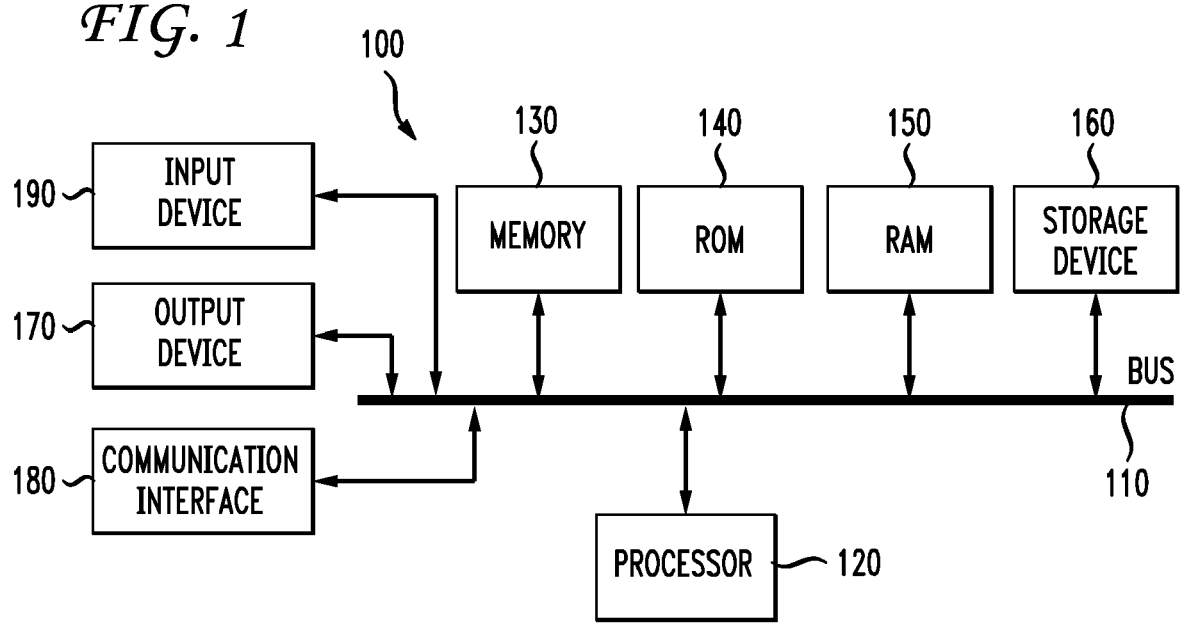
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. A processing unit 120 can include a general purpose CPU controlled by software as well as a special-purpose processor. An Intel Xeon LV L7345 processor is an example of a general purpose CPU which is controlled by software. Particular functionality may also be built into the design of a separate computer chip. An STMicroelectronics STA013 processor is an example of a special-purpose processor which decodes MP3 audio files. Of course, a processing unit includes any general purpose CPU and a module configured to control the CPU as well as a special-purpose processor where software is effectively incorporated into the actual processor design. A processing unit may essentially be a completely self-contained computing system, containing multiple cores or CPUs, a bus, memory controller, cache, etc. A multi-core processing unit may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. In one aspect, a hardware module that performs a particular function includes the software component stored in a tangible computer-readable medium in connection with the necessary hardware components, such as the CPU, bus, display, and so forth, to carry out the function. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software and hardware, such as a processor, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits.

An exemplary system for pronunciation modeling first removes as much non-dialectal acoustic variation as possible. Second, the system uses an alternative phoneme label of the same phoneme instead a different phoneme label for dialectal variation. For example, the dictionary includes interchangeable equivalents "ae1" and "ae2" representing different dialectal pronunciations for the same generic phoneme rather than alternatives "ae" and "ey". The system can continue with one of two alternative paths. In the first, the system preserves the acoustic model with all the alternative acoustic models for different dialects, builds several dialect-dependent dictionaries based on transcriptions obtained by speakers clustered to belong to that dialectal group, and retrains the acoustic model to reflect the constraints gathered from the clustering. In the second alternative path, the system maintains a single dictionary with canonical, genericized phonemic pronunciations. The dictionary includes multiple acoustic models, each trained only on the subset of the training data belonging to a dialectal class. The acoustic models essentially indicate a set of dialect-based phoneme pronunciations, one for each canonical phonemic pronunciation.

Accurate dialectal modeling with improved recognition accuracy increases customer satisfaction while using fewer resources to perform speech-related tasks. This approach to pronunciation modeling can demonstrate particularly high recognition accuracy improvements for dialects that significantly differ from the most highly represented generic dialects. Thus, the principles disclosed herein can make speech interfaces attainable to those people who currently find such systems unusable due to accent differences.

Figure 2:
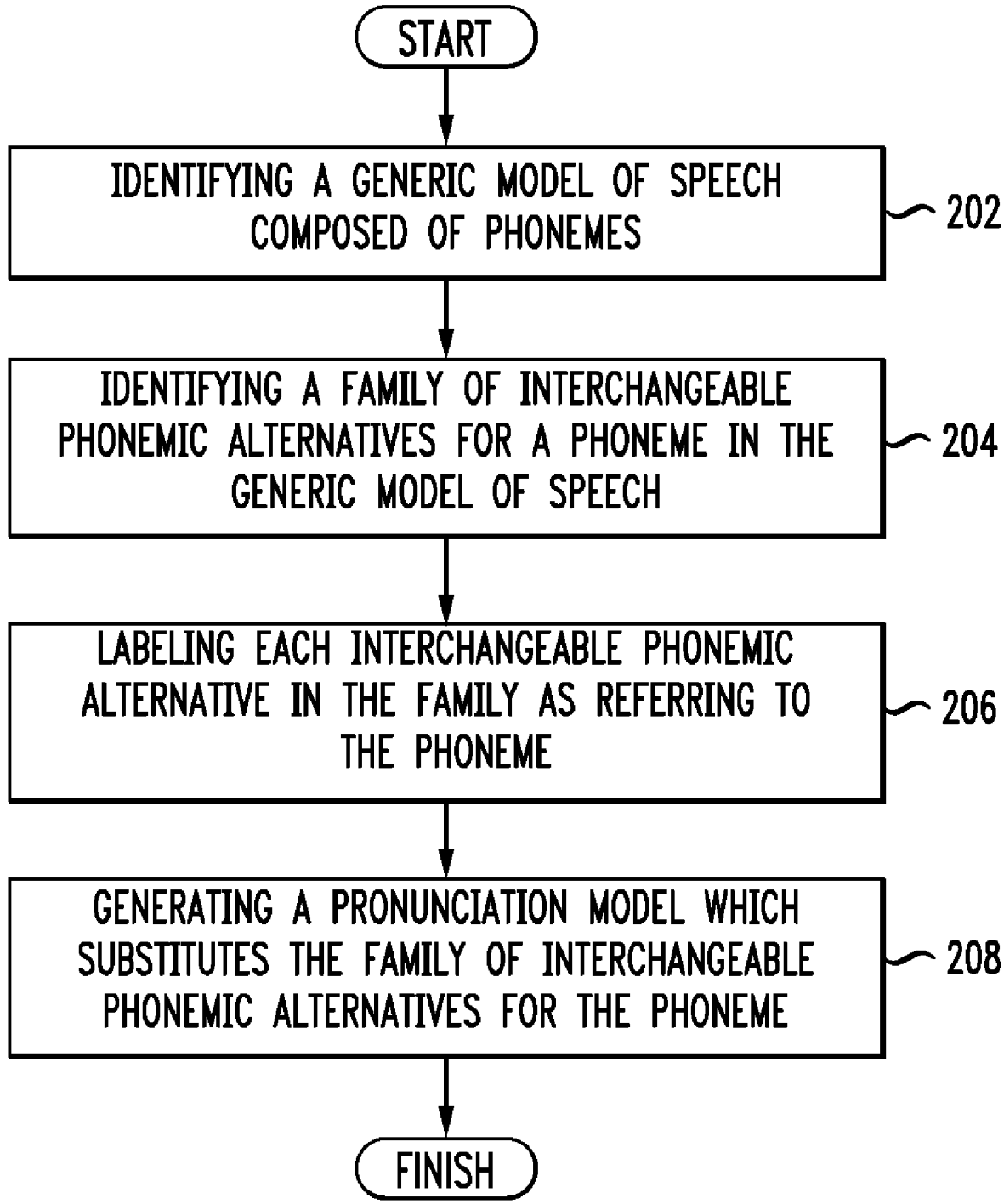
FIG. 2 illustrates an example method embodiment for generating a pronunciation model.

Having disclosed some fundamental system elements and fundamental concepts, the disclosure turns to the example method embodiment for generating a pronunciation model as illustrated in FIG. 2. For simplicity, the method is discussed in terms of a system configured to practice the method. The system identifies a generic model of speech composed of phonemes (202). The generic model of speech can be a universal model of an "ideal" accent. The generic model of speech can be independent of any particular person. The generic model of speech can be a vocal tract length normalized acoustic model. In one embodiment, the system removes as much acoustic variation as possible that is non-dialectal.

The system identifies a family of interchangeable phonemic alternatives for a phoneme in the generic model of speech (204). Interchangeable phonemic alternatives can represent a same phoneme for different dialectal classes. Interchangeable phonemic alternatives can include phoneme strings. Instead of using a different phoneme label for each dialectal variation, the system uses an alternative label of the same phoneme. For example, the system does not represent different phonemes to pronounce a particular syllable in a particular word, but alternatives for the same phoneme. The system can identify one family of interchangeable phonemic alternatives for each phoneme in the generic model of speech.

The system labels each interchangeable phonemic alternative in the family as referring to the phoneme (206). The system generates a pronunciation model which substitutes the family of interchangeable phonemic alternatives for the phoneme (208). The system can follow one of two alternatives. The first alternative preserves the acoustic model with all the alternative acoustic models for different dialects and builds several dialect-dependent dictionaries based on transcriptions obtained by speakers clustered to belong to that dialectal group. Then the system can retrain the acoustic model to reflect the constraints of the clustering. The second alternative maintains a single dictionary with canonical phonemic pronunciations, but with multiple acoustic models, each trained only on the subset of the training data belonging to a dialectal class.

Figure 3:
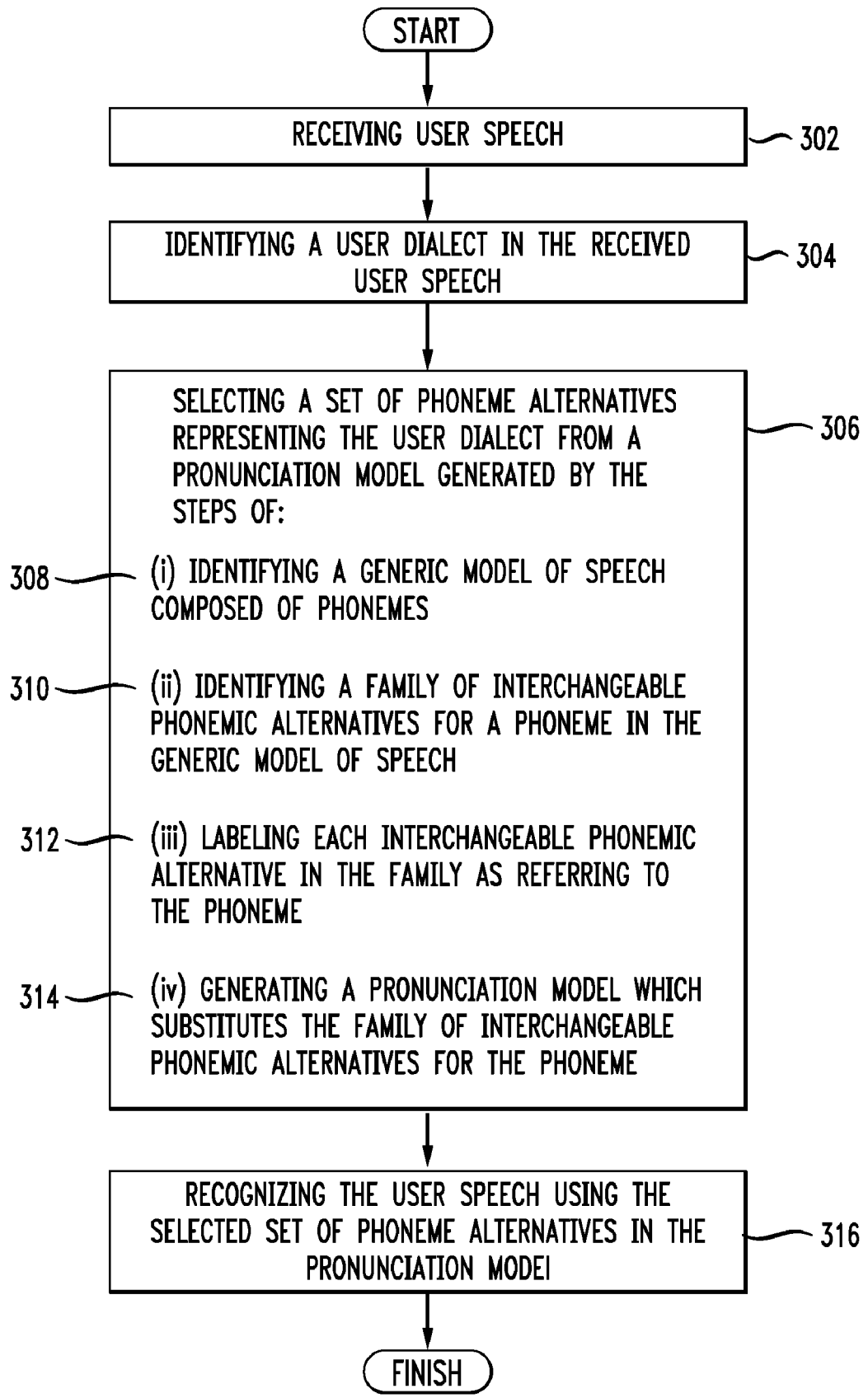
FIG. 3 illustrates an example method embodiment for recognizing speech using a pronunciation model.

FIG. 3 illustrates an example method embodiment for recognizing speech using a pronunciation model as generated in the method illustrated in FIG. 2. The method of FIG. 3 is discussed in terms of a system configured to practice the method. The system first receives user speech (302). The system identifies a user dialect in the received user speech (304). The system can identify a user dialect by recognizing the received user speech with a plurality of dialect models, eliminating dialect models which do not phonemically match the received user speech until a single dialect model remains, and identifying the remaining single dialect model as the user dialect model. The system can identify the user dialect using this approach or others known in the art. The system can organize speakers in groups based on which phoneme variants they use.

The system selects a set of phoneme alternatives representing the user dialect (306) from a pronunciation model generated by the steps of: identifying a generic model of speech composed of phonemes (308), identifying a family of interchangeable phonemic alternatives for a phoneme in the generic model of speech (310), labeling each interchangeable phonemic alternative in the family as referring to the phoneme (312), and generating a pronunciation model which substitutes the family of interchangeable phonemic alternatives for the phoneme (314). Finally, the system recognizes the user speech using the selected set of phoneme alternatives in the pronunciation model (316).

The system does not build the dictionary with different phonemes; the system builds it with variants of the same phoneme. In this way, the system ties phoneme variants together so a change in one phoneme variant affects the rest of the dictionary instead of simply ignoring the change in other parts of the dictionary. Similarly, when the system detects a particular phoneme substitution, the system can extrapolate a pattern of phoneme substitutions for the speaker or for a dialect group of the speaker. This approach can influence how the system partitions training data.

One natural extension of this approach is to provide or establish a dictionary per person, because each person speaks with a slightly different personalized accent. For example, the system can tie a particular pronunciation to a particular speaker. The system can, over time, adapt a dictionary just for a particular person.

In one aspect, the system starts with a dictionary containing only one model per phoneme. The system can create multiple versions of each phoneme by partitioning data. The system can partition data based on locality or recognized characteristics. The system can determine a different path through the phoneme path and rebuild the model for each speaker. Then the system can partition the speakers based on dialect and build different dictionaries for each group of speakers. At this point, the system can recognize further speech using multiple dictionaries in parallel. When receiving speech, the system can disable the dictionaries used in parallel which do not match the further speech until eventually a single, correct dictionary remains.

Figure 4:
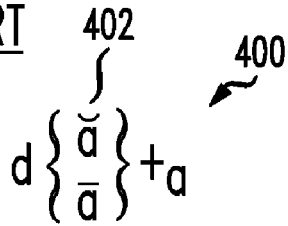
FIG. 4 illustrates a prior art approach to pronunciation modeling.

FIG. 4 illustrates a prior art approach to pronunciation modeling. This pronunciation model 400 shows two different pronunciations for the word "data": "'dei-tə'" and "'dæ-tə'". The primary difference is in the first vowel. Traditional pronunciation modeling approaches this dialectal difference with two different, alternate representations 402 of the phoneme. Because the word "data" can use one of two separate phonemes, the pronunciation model treats both pronunciation variants as different words.

Figure 5:
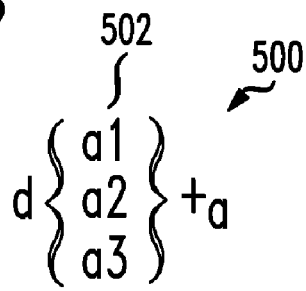
FIG. 5 illustrates an example pronunciation model.

In contrast, FIG. 5 illustrates an example pronunciation model according to the principles disclosed herein. This pronunciation model 500 also shows different pronunciations for the word "data". Instead of using separate representations, the model includes phoneme variants a1, a2, a3 502 which each represent the same generic normalized phoneme. Each phoneme variant has the same meaning even if pronounced differently. For example, in a Southern accent, "i" is pronounced "ah". In that case, the system labels "ah" as "i2" (because it is a second variation of "i") or "i_southern" rather than "ah". The system can assign each phoneme the same label with a different suffix. This approach allows the system to appropriately partition training data. The system can track phoneme variants for a user or a group of speakers with a similar accent and apply the appropriate phoneme variants when recognizing their speech.

In some cases, when the system identifies one phoneme variant, the system can then determine that speech is of a particular pattern, such as Southern or New Yorker. The system can weight probabilities of phoneme variants according to the speech pattern in order to more effectively perform pronunciation modeling. While the example shown here indicates alternative phonemes for a vowel, the same principles are also applicable to consonants.

Figure 6:
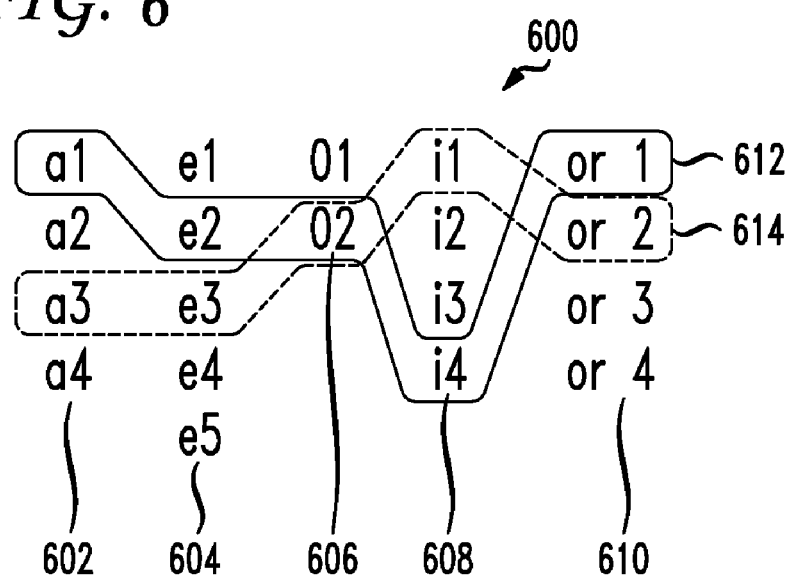
FIG. 6 illustrates a sample pronunciation model dictionary showing two paths through the dictionary.

FIG. 6 illustrates a sample pronunciation model dictionary showing two paths through the dictionary. The pronunciation model dictionary 600 includes phoneme variants for many phonemes, 4 variants for "a" 602, 5 variants for "e" 604, 2 variants for "o" 606, 4 variants for "i" 608, and 4 variants for "or" 610. While the variants shown here are vowels, the same principles apply equally to non-vowel phonemes. Speech dialect patterns are sets of pronunciation differences which define a dialect. For example, one accent uses the first "a" variant, the second "e" variant, the second "o" variant, and so forth. The system represents an accent or phoneme dialect with a path 612, 614 through the phoneme variants. The system can use these paths to recognize speech using the identified variants. This is based on the theory that if a user pronounces a word using one variant, that same variant is more likely to occur later. In some applications, the system can assemble a custom pronunciation model using only phoneme variants used by a specific accent. The system can tailor such a custom pronunciation model to a specific regional dialect, group, or even an individual. For example, when recognizing speech from a telephone caller, the system can link to a user identifier, such as a user profile or telephone number, and retrieve a custom pronunciation model.

In one aspect, the system detects accents by running multiple recognition passes in parallel. Each recognition pass does not consider all paths through the pronunciation model. Rather, they only consider the good paths. Most alternative pronunciations will disappear from consideration very quickly because they are not used. Extra recognition passes do not affect the speed of running the recognition. Typically at the end of a short period of recognition, such as a sentence, only one result survives. The system uses that result as the pronunciation dictionary. In another aspect, the acoustic models are the same and the acoustic models are appropriate, but the dictionary is a single dictionary where the probabilities are determining which of these alternative phonemes are more likely than others. In this aspect, there is no tie across the sentence. One benefit is that the acoustic model is a lot sharper. In one case you train the model, now you have acoustic models for each of the variants of the phonemes and the dictionary allows any one of them with appropriate probabilities based on what your training data looks like. In yet another aspect, the system uses multiple dictionaries and ties the pronunciation across the whole sentence to narrow down the alternatives. A single dictionary can indicate a most likely variation.

The multiple dialectal paths through the pronunciation models can be used to train humans to speak with one accent or another in a convincing way. A system can receive speech, determine which accent the speech is closest to using the paths through phoneme variants in a pronunciation model, and provide feedback to the user regarding the determination. For example, the system can tell the user which accent it detected, what parts of the speech were a good match, which parts of the speech need improvement, and how to pronounce them more appropriately. The system could say "Your 'a' and 'o' pronunciation are exactly like a New Yorker. Your 'e' and 'or' pronunciations need work. They should sound like . . . ". Such a system can have application to people learning English as a foreign language, English speakers who desire to speak with a particular accent, or even foreign language accents.

Embodiments within the scope of the present invention may also include computer-readable media for carrying or having computer-executable instructions or data structures stored thereon. Such computer-readable media can be any available media that can be accessed by a general purpose or special purpose computer, including the functional design of any special purpose processor as discussed above. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, data structures, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the invention. For example, the principles herein can be applied to any speech recognition situation where callers have different pronunciation dialects. One such example is a nationwide call center which encounters callers with a variety of regional accents. Those skilled in the art will readily recognize various modifications and changes that may be made to the present invention without following the example embodiments and applications illustrated and described herein, and without departing from the true spirit and scope of the present invention.

We claim:

1. A computer-implemented method of generating a pronunciation model, the method comprising:
    identifying a generic model of speech composed of phonemes;
    identifying a family of interchangeable phonemic alternatives for a phoneme in the generic model of speech;
    labeling each interchangeable phonemic alternative in the family as referring to the phoneme; and
    generating a pronunciation model which substitutes the family of interchangeable phonemic alternatives for the phoneme.

2. The computer-implemented method of claim 1, wherein the generic model of speech is a vocal tract length normalized acoustic model.

3. The computer-implemented method of claim 1, wherein interchangeable phonemic alternatives represent a same phoneme for different dialectal classes.

4. The computer-implemented method of claim 1, wherein interchangeable phonemic alternatives comprise phoneme strings.

5. The computer-implemented method of claim 1, the method further comprising identifying one family of interchangeable phonemic alternatives for each phoneme in the generic model of speech.

* * * * *